United States Patent
Furuno et al.

(10) Patent No.: US 7,874,585 B2
(45) Date of Patent: Jan. 25, 2011

(54) AIRBAG FOR A FRONT PASSENGER'S SEAT

(75) Inventors: Tsuyoshi Furuno, Aichi-ken (JP);
Yasushi Okada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 636 days.

(21) Appl. No.: 11/812,394

(22) Filed: Jun. 19, 2007

(65) Prior Publication Data

US 2008/0007036 A1    Jan. 10, 2008

(30) Foreign Application Priority Data

Jun. 21, 2006    (JP) ............................... 2006-171632

(51) Int. Cl.
*B60R 21/16* (2006.01)
(52) U.S. Cl. .................. 280/743.1; 280/732; 280/743.2
(58) Field of Classification Search ................. 280/732, 280/743.1, 743.2
See application file for complete search history.

(56) References Cited

U.S. PATENT DOCUMENTS

| 7,364,188 B2 * | 4/2008 | Hasebe et al. ............... 280/732 |
| 7,461,862 B2 * | 12/2008 | Hasebe et al. ............. 280/743.2 |
| 2006/0049618 A1 * | 3/2006 | Bito ........................... 280/732 |
| 2006/0232054 A1 * | 10/2006 | Schlosser et al. ......... 280/743.2 |
| 2007/0284864 A1 * | 12/2007 | Anaya et al. ............. 280/743.1 |

FOREIGN PATENT DOCUMENTS

JP    2006-103654    4/2006

* cited by examiner

*Primary Examiner*—Eric Culbreth
(74) *Attorney, Agent, or Firm*—Posz Law Group, PLC

(57) ABSTRACT

The airbag for a front passenger's seat includes an inner panel comprised of a pair of left and right base cloths. Each of the base cloths has a band shape curved in a generally C shape. A circumferential edge of a communication area communicating left and right shoulder restraining portions of the airbag is constituted by a joint portion joining inner edges of the respective base cloths together. The joint portion includes a corner area having a large curvature. Each of the base cloths includes a reinforcing portion at its inner edge for preventing the corner area from being so deformed as to reduce the curvature thereof upon airbag deployment.

10 Claims, 11 Drawing Sheets

AIRBAG FOR A FRONT PASSENGER'S SEAT

The present application claims priority from Japanese Patent Application No. 2006-171632 of Furuno et al., filed on Jun. 21, 2006, the disclosure of which is hereby incorporated into the present application by reference.

BACKGROUND OF THE INVENTION

1. Field of the Invention

The present invention relates to an airbag used for an airbag apparatus for a front passenger's seat mounted on a top plane of the instrument panel in front of the front passenger's seat.

2. Description of Related Art

In a conventional airbag for a front passenger's seat shown in JP 2006-103654, an airbag includes a passenger protection area on its rear side at full inflation. The passenger protection area includes a pair of shoulder restraining portions disposed laterally side by side at areas from a top side to the rear side of the fully inflated airbag. Each of the restraining portions projects continuously from the top side to the rear side of the airbag.

The above conventional airbag for a front passenger's seat is formed by joining peripheral edges of an outer panel and an inner panel. The inner panel is composed of a pair of left and right cloth members having generally the same contours. The cloth members have such a structure as to laterally divide an area of the inner panel at full airbag inflation into two. The cloth members each has a band shape curved in a generally C shape, and are formed into the inner panel by being joined at respective inner circumferential edges. The joint portion, which is formed when joining the inner circumferential edges, provides a circumferential edge of a communication area communicating the left and right shoulder restraining portions.

The joint portion formed when joining the inner circumferential edges of the cloth members for the inner panel includes a corner portion where a curvature is partially large. The corner portion is likely to be so deformed as to lessen its curvature when subjected to stress concentration upon airbag deployment, which results in less projection of the shoulder restraining portions. In light of this, there is a room for improvement in stabilizing the inflated contour of the airbag for proper protection of a passenger.

SUMMARY OF THE INVENTION

An object of the present invention is to provide an airbag for a front passenger's seat inflatable into a steady contour for proper protection of a passenger.

The object of the present invention is attained by an airbag having a following structure:

The airbag for a front passenger's seat is folded and housed on a top plane of an instrument panel in front of a front passenger's seat of a vehicle, and protrudes upward and deploys rearward when fed with inflation gas in such a manner as to fill in a space between the top plane of the instrument panel and a windshield disposed above the instrument panel.

The airbag includes a gas inlet port for introducing inflation gas at the vicinity of its front end at full inflation and a passenger protection area for protecting a passenger seated in the front passenger's seat, at a rear side of the fully inflated airbag.

The airbag is formed into a generally square conical contour whose top is disposed at the front end of the airbag at full inflation and includes a left side wall and a right side wall deployed at lateral sides of the airbag and extending generally along a longitudinal direction, an upper side wall and a lower side wall deployed at upper and lower sides of the airbag and extending generally along the lateral direction, and a rear side wall deployed toward the seat and extending generally along the lateral direction in such a manner as to connect the upper side wall and the lower side wall.

The airbag is composed by joining peripheral edges of a plurality of base cloths and includes an outer panel constituting the left side wall and the right side wall, and an inner panel constituting the upper side wall, the lower side wall and the rear side wall.

The inner panel is composed of a pair of left and right base cloths having generally the same contours, and the base cloths have such a structure as to divide an area of the inner panel at full airbag inflation into two laterally.

The base cloths each has a band shape curved in a generally C shape, and are formed into the inner panel by joining outer circumferential edges of the respective base cloths to outer edges of regions of the outer panel constituting the left side wall and the right side wall and by joining inner circumferential edges of the respective base cloths together.

The passenger protection area includes a pair of left and right shoulder restraining portions disposed laterally side by side at areas from a top to the rear of the fully inflated airbag, each of which restraining portions projecting continuously from the top to the rear of the airbag.

A joint portion, which is formed when joining the inner circumferential edges of the base cloths together for forming the inner panel, constitutes a circumferential edge of a communication area communicating the left and right shoulder restraining portions.

The joint portion includes a corner area and a remaining general area, and the corner area has a larger curvature than that of the general area.

The joint portion includes a reinforcing portion at the inner circumferential edge of the base cloths for suppressing such a deformation of the corner area as to reduce the curvature thereof upon airbag deployment.

In the airbag for a front passenger's seat of the present invention, although the joint portion formed by joining the inner circumferential edges of the base cloths for forming the inner panel has a corner area having a large curvature, the joint portion is prevented, due to the reinforcing portion formed on the inner circumferential edges of the base cloths, from being so deformed as to reduce the curvature of the corner area upon airbag deployment. Hence the whole joint portion also serving as the circumferential edge of the communication area communicating the left and right shoulder restraining portions is held from being deformed into a generally round contour, thereby suppressing the deformation of projected contours of the shoulder restraining portions located at both sides of the communication area, and suppressing a change of a clearance between the restraining portions. Consequently, the airbag is inflated into a steady contour.

When the inflated airbag of the present invention is thrown against a passenger, the shoulder restraining portions steadily projected rearward firstly receive the vicinities of left and right shoulders of the passenger, thereby reducing the forward kinetic energy of the passenger. Thereafter, a head of the passenger whose shoulders are restrained by the restraining portions enters into an area recessed relative to the shoulder restraining portions between the restraining portions, and then is restrained and suppressed from moving forward. That is, the airbag is capable of receiving the head of the passenger whose kinetic energy has been reduced by the shoulder restraining portions softly while applying less reaction force.

Moreover, since the joint portion is prevented from being deformed, the contour of the recessed area is steady, too, so that the passenger's head is prevented from engaging the joint portion located at the leading end or bottom of the recessed area unduly. Accordingly, the airbag of the present invention protects the passenger in a stable manner by the shoulder restraining portions and the recessed area located between the shoulder restraining portions.

Therefore, the airbag of the present invention is inflated into a steady contour for proper protection of a passenger.

Specifically, the reinforcing portion is desirably comprised of an extended portion formed by extending the inner circumferential edge of each of the base cloths for forming the inner panel inward from the joint portion at a region encompassing at least the corner area in such a manner as to enlarge a margin from the joint portion and reduce a length of the inner circumferential edge.

With this arrangement, since the length of the edge of the extended portion is set shorter relative to the corner area of the sewn portion, in the event that such a stress is applied to the corner area as to widen or elongate the corner area upon airbag deployment, the inner edge of the extended portion counteracts such a deformation as to elongate the corner area, so that the corner area is prevented from being deformed to reduce its curvature.

The extended portion may be comprised of the base cloth for forming the inner panel itself.

The extended portion may also be comprised of a reinforcing cloth prepared as a separate entity from the base cloths for forming the inner panel and joined to the joint portion together with the base cloths. With this arrangement, the area around the joint portion is further reinforced, thereby further suppressing the deformation in the vicinities of the corner area of the joint portion in comparison with an instance with no reinforcing cloths.

It will also be appreciated that the base cloths for forming the inner panel are made of a fabric woven by warps and wefts, and either the warps or the wefts extend generally along a tangential direction of the corner area, and that the reinforcing portion is comprised of the warps or the wefts extending generally along the tangential direction of the corner area.

With this arrangement, even if the corner area is stretched out forcefully upon airbag deployment, either the wefts or warps weaving the base cloths extend along the stretching direction of the corner area, not on the bias to the stretching direction, so that the warp or weft yarns counteract the stretching force and help prevent the corner area from being deformed to be elongated along the stretching direction.

It will also be appreciated that the airbag further includes a reinforcing cloth joined together with the base cloths to an entire area of the joint portion and proximate the inner circumferential edges of the base cloths, the reinforcing cloth being a separate entity from the base cloths and having a band shape extending along the joint portion, and that the reinforcing cloth is made of a fabric woven by warps and wefts, and either the warps or the wefts extend generally along a tangential direction of the corner area, and that the reinforcing portion is comprised of the warps or wefts extending generally along the tangential direction of the corner area.

With this arrangement, since either the warps or wefts weaving the reinforcing cloth are arranged to extend generally along the tangential direction of the corner area, in the event that the corner area is stretched out upon airbag deployment, the warps or the wefts counteract the stretching direction, so that the corner area is prevented from being deformed to be elongated along the stretching direction.

It will further be appreciated that the reinforcing cloth is comprised of a plurality of split parts split up at more than one position on the joint portion, and that either warps or wefts weaving one of the split parts disposed on the corner area extend generally along a tangential direction of the corner area.

This structure helps improve the yield of base cloth for forming the reinforcing cloth in comparison with an instance where the reinforcing cloth is composed of a single piece of cloth member. Moreover, since either the warps or wefts weaving the split part of the reinforcing cloth applied to the corner area are arranged to extend generally along the tangential direction of the corner area, in the event that the corner area is stretched out upon airbag deployment, the warps or the wefts counteract the stretching direction, so that the corner area is prevented from being deformed to be elongated along the stretching direction. In addition, if the joint portion includes more than one corner area having larger curvatures than the remaining general portion, the split-up structure of the reinforcing cloth makes it possible to make either warps or wefts of split parts applied to the corner areas of the joint portion extend along the tangential directions of the corner areas according to each of the corner areas, which is further preferable.

It will further be appreciated that the reinforcing portion is comprised of a band-shaped tether disposed to cut across the communication area communicating the shoulder restraining portions and jointed to the inner circumferential edges of the base cloths for forming the inner panel at opposite ends.

With this structure, the tether disposed to cut across the communication area counteracts the stretching force trying to elongate the corner area of the joint portion upon airbag deployment, so that the joint portion is held from being deformed greatly.

BRIEF DESCRIPTIONS OF DRAWINGS

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
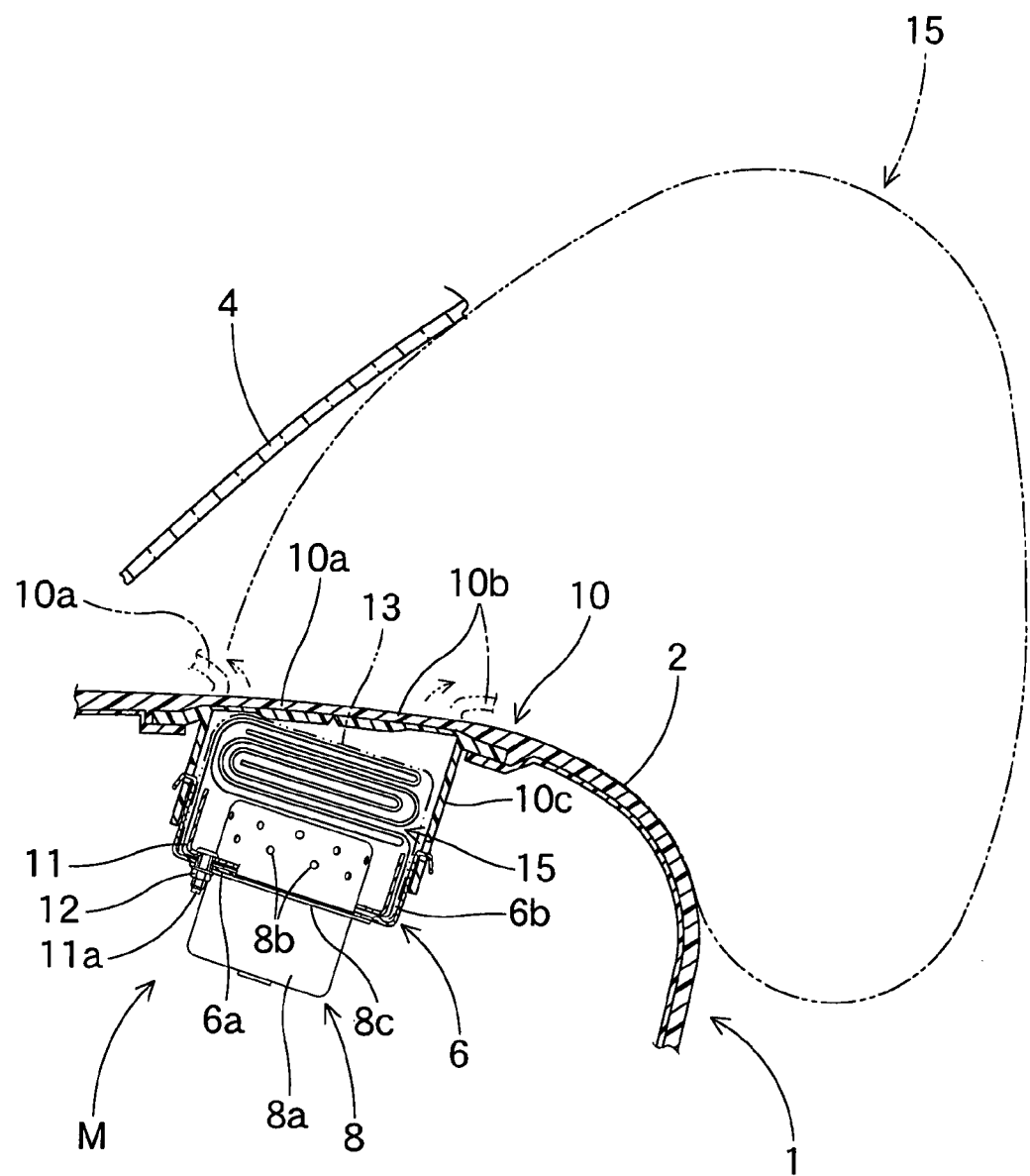
FIG. 1 is a sectional view of an airbag apparatus which uses an airbag embodying the present invention, taken along the longitudinal direction of a vehicle.

Referring to FIG. 1, an airbag 15 for a front passenger's seat embodying the present invention is used as a component of an airbag apparatus M, which apparatus M is a topmount type that is mounted in an interior of a top plane 2 of an instrument panel or dashboard 1. Airbag apparatus M includes a folded airbag 15, an inflator 8 for supplying airbag 15 with inflation gas, a case 6 for housing and holding airbag 15 and inflator 8, a retainer 11 for attaching airbag 15 to case 6, and an airbag cover 10 for covering the folded airbag 15.

Up-down, front-rear, and left-right directions in this specification correspond to up-down, front-rear, and left-right directions of a vehicle being steered straight ahead.

Airbag cover 10 is integral with dashboard 1 made from synthetic resin, and includes two doors, i.e. front and rear doors 10a and 10b adapted to open when pushed by the inflating airbag 15 upon airbag deployment. Airbag cover 10 further includes a joint wall 10c by which airbag cover 10 is coupled to case 6. Joint wall 10c is arranged around doors 10a and 10b.

Inflator 8 includes a body portion 8a having a generally columnar shape and provided with gas discharge ports 8b, and a flange 8c for attaching inflator 8 to case 6.

Case 6 is made of sheet metal into a generally rectangular parallelepiped shape, and has a rectangular opening at the top. Case 6 includes a bottom wall 6a having a generally rectangular plate shape to which inflator 8 is attached from lower side by insertion, and a circumferential wall 6b extending upward from an outer edge of bottom wall 6a for retaining joint wall 10c of airbag cover 10. Case 6 is further provided with unillustrated brackets, in bottom wall 6a, for attachment of case 6 to the vehicle body.

Airbag 15 and inflator 8 are secured to case 6 by attaching an annular retainer 11 inside airbag 15 such that bolts 11a of retainer 11 are put through airbag 15, bottom wall 6a of case 6, and flange 8c of inflator 8, and then fastened into nuts 11.

Referring to FIGS. 2 to 5, airbag 15 includes a bag body 16 and a flow regulating cloth 29 disposed inside bag body 16. When fully inflated, airbag 15 is formed into a generally square conical shape whose top is at a front end of airbag 15. Bag body 16 includes an upper side wall 16a and a lower side wall 16b extending generally along the lateral direction on upper and lower sides, a left side wall 16c and a right side wall 16d extended generally along the longitudinal direction on left and right sides, and a rear side wall 16e extended generally along the lateral direction to face a passenger in such a manner as to connect upper side wall 16a and lower side wall 16b. Bag body 16 of the embodiment includes a passenger protection area 25 arranged at a rear side to face toward a passenger upon airbag inflation, and a vehicle body side area 17 arranged in front of protection area 25 and deployed between dashboard 1 and a wind shield 4 upon airbag inflation. Vehicle body side area 17 has a generally cylindrical shape closed at its front end. Bag body 16 further includes a round gas inlet port 19 for introducing inflation gas, in the vicinity of the lateral center of vehicle body side area 17 and proximate to a front end of lower side wall 16b of the fully inflated bag body 16. In a periphery 18 of inlet port 19 are mounting holes 20 for receiving bolts 11a of retainer 11 to attach the peripheral region 18 of port 19 to bottom wall 6a of case 6. On each of left side wall 16c and right side wall 16d of bag body 16 is a vent hole 23 for exhausting extra inflation gas.

Figure 2:
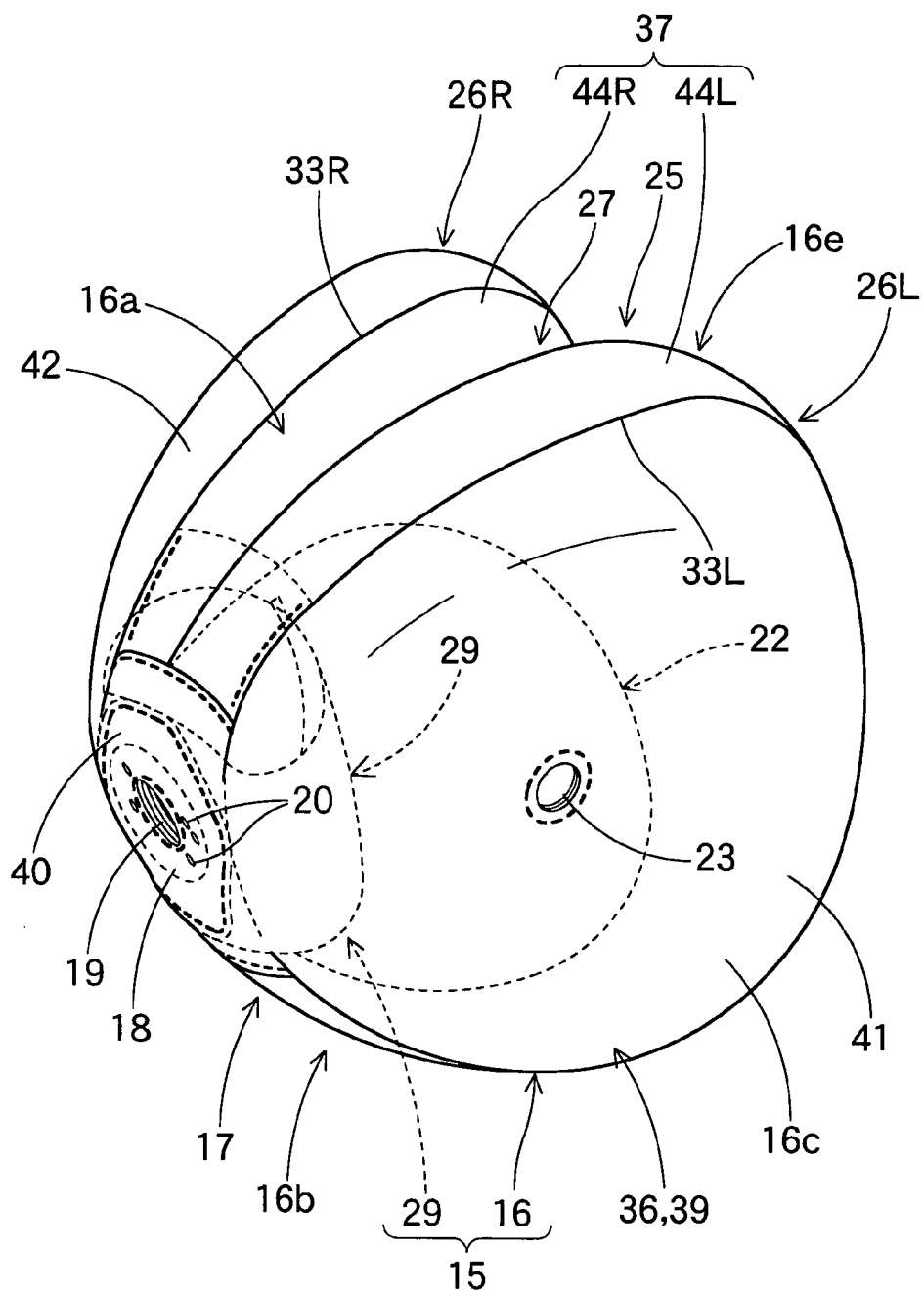
FIG. 2 is a perspective view of the airbag of FIG. 1 inflated by itself and viewed from the front side.
Figure 3:
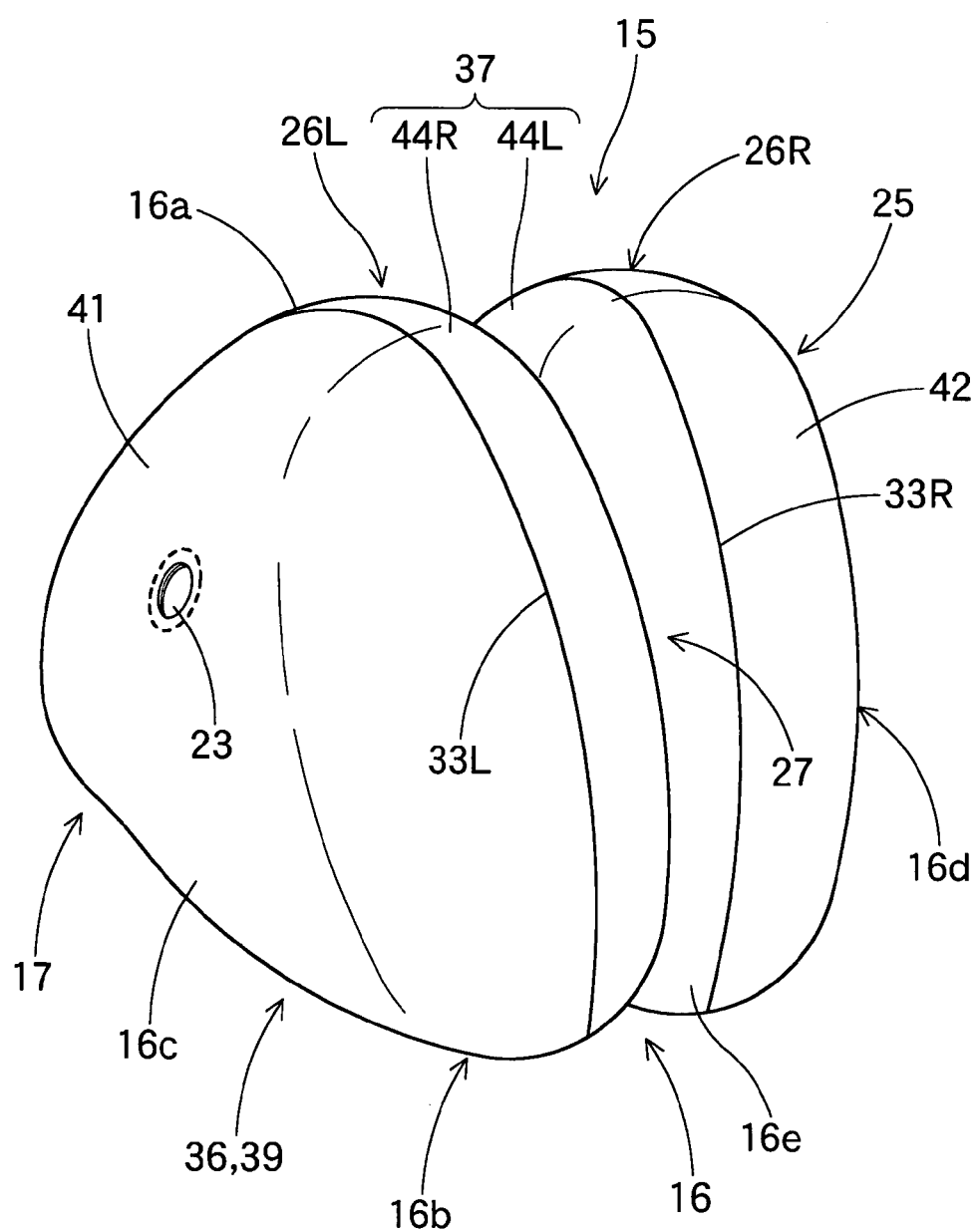
FIG. 3 is a perspective view of the airbag of FIG. 1 inflated by itself and viewed from the rear side.

Passenger protection area 25 includes a pair of shoulder restraining portions 26L and 26R disposed laterally side by side in such a manner as to project rearward while extending vertically, and a recess 27 recessing from an upper side to a rear side between left and right shoulder restraining portions 26L and 26R. In this embodiment, the rise of left and right shoulder restraining portions 26L and 26R and the recess of recess 27 continue to the vicinity of gas inlet port 19 of vehicle body side area 17 in such a manner as to extend forward to enter areas of upper side wall 16a and lower side wall 16b from rear side wall 16e of bag body 16, but this unevenness stops in a lower part 40 of a later-described first base cloth 39 as shown in FIGS. 2 to 4.

Figure 4:
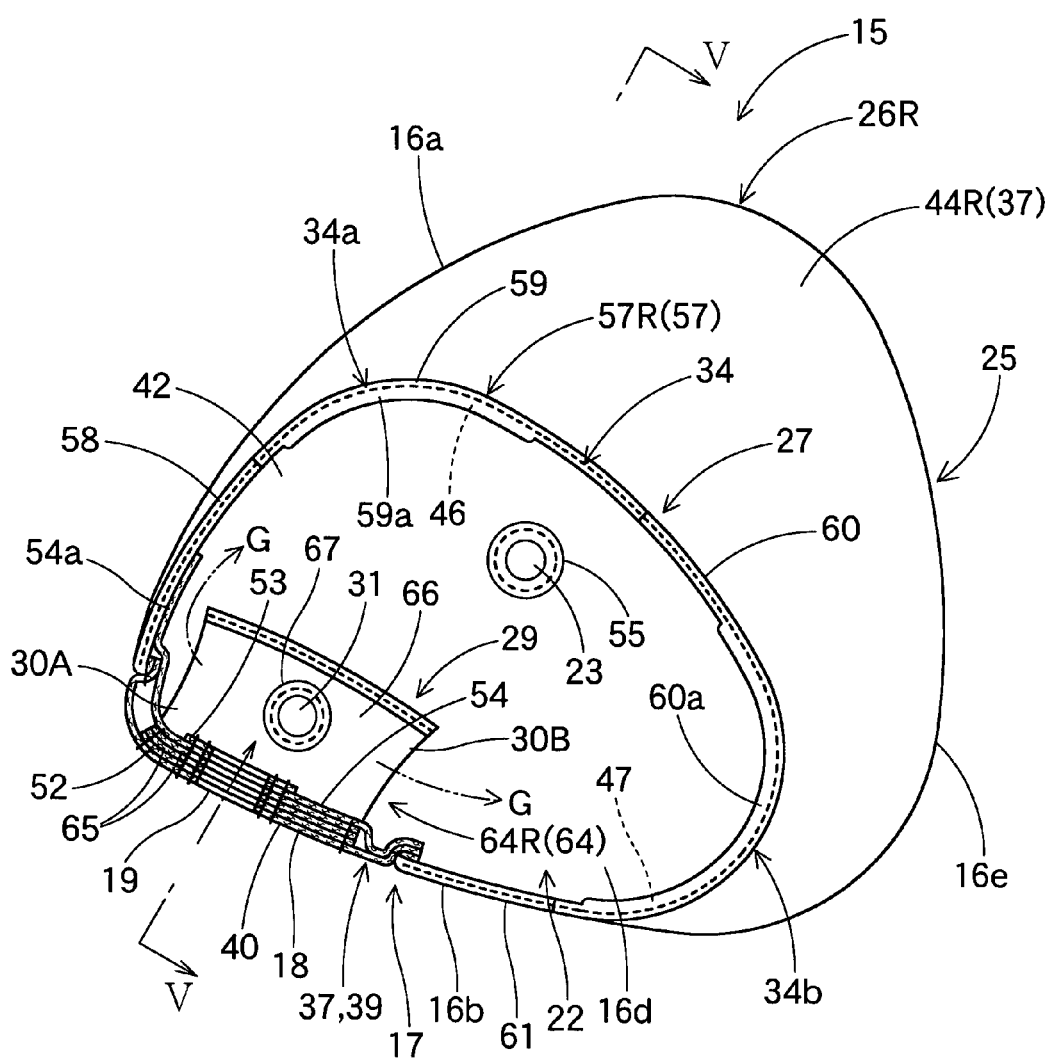
FIG. 4 is a sectional view of the airbag of FIG. 1 inflated by itself taken along the longitudinal direction.
Figure 5:
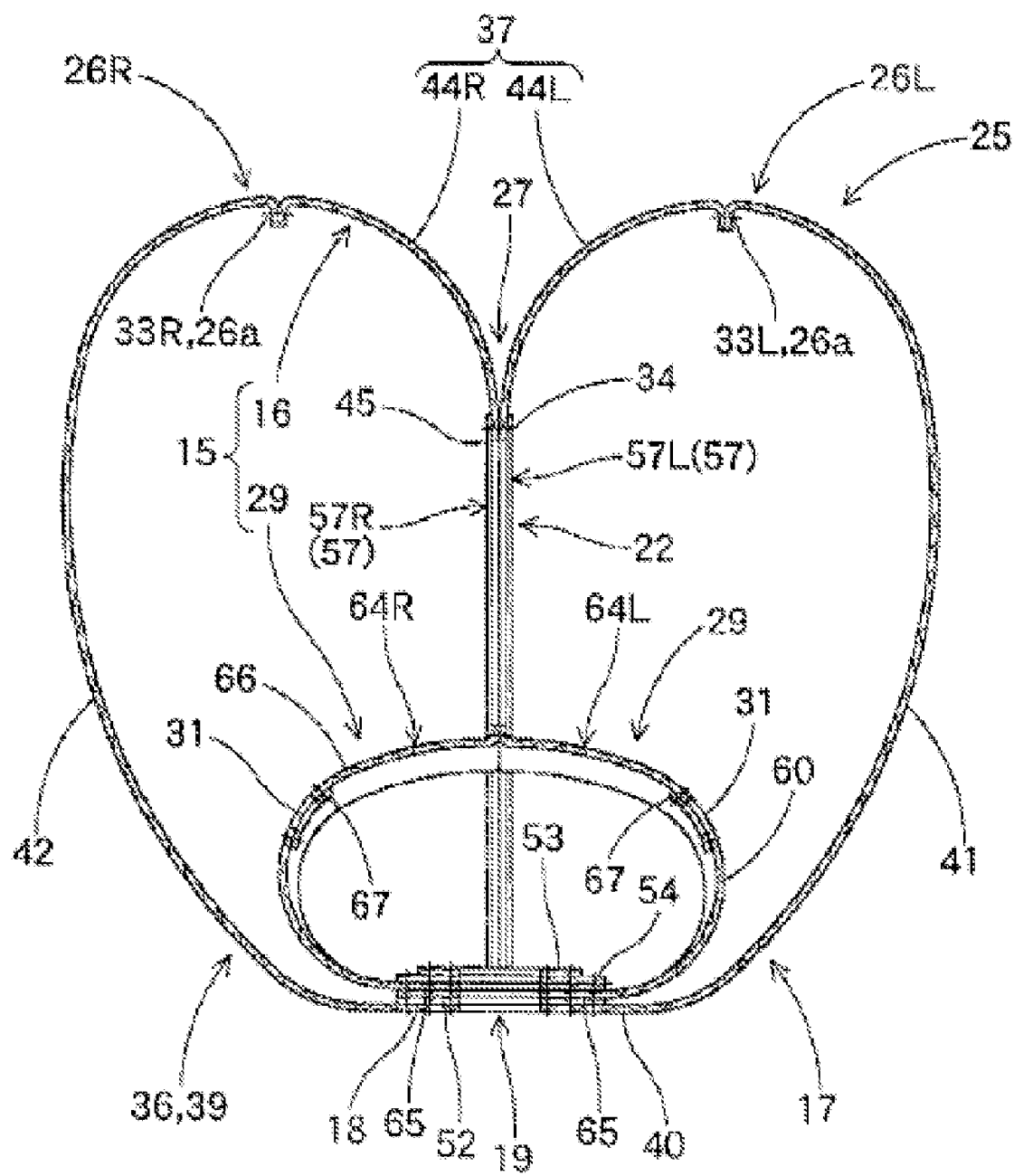
FIG. 5 is a sectional view of the airbag of FIG. 1 inflated by itself taken along line V-V of FIG. 4.

Referring to FIGS. 4 and 5, flow regulating cloth 29 is disposed over gas inlet port 19 inside bag body 16. Flow regulating cloth 29 is formed into a generally cylindrical shape opened at front and rear ends so as to redirect inflation gas G fed via inlet port 19 forward and rearward. In airbag 15, more specifically, inflation gas G fed via inlet port 19 is supplied into bag body 16 from front and rear openings 30A and 30B of flow regulating cloth 29. Flow regulating cloth 29 further includes round through holes 31 each of which has a smaller opening area than front and rear openings 30A or 30B and is adapted to release inflation gas supplied from inlet port 19. In the illustrated embodiment, through holes 31 are located at two laterally symmetric positions above inlet port 19 at full inflation of airbag 15. Through holes 31 help stabilize the orientations of front and rear openings 30A and 30B of flow regulating cloth 29 so as to stabilize the outflow directions of inflation gas G flowing into bag body 16, upon airbag deployment, by releasing a portion of inflation gas G flown in via inlet port 19.

Figure 6:
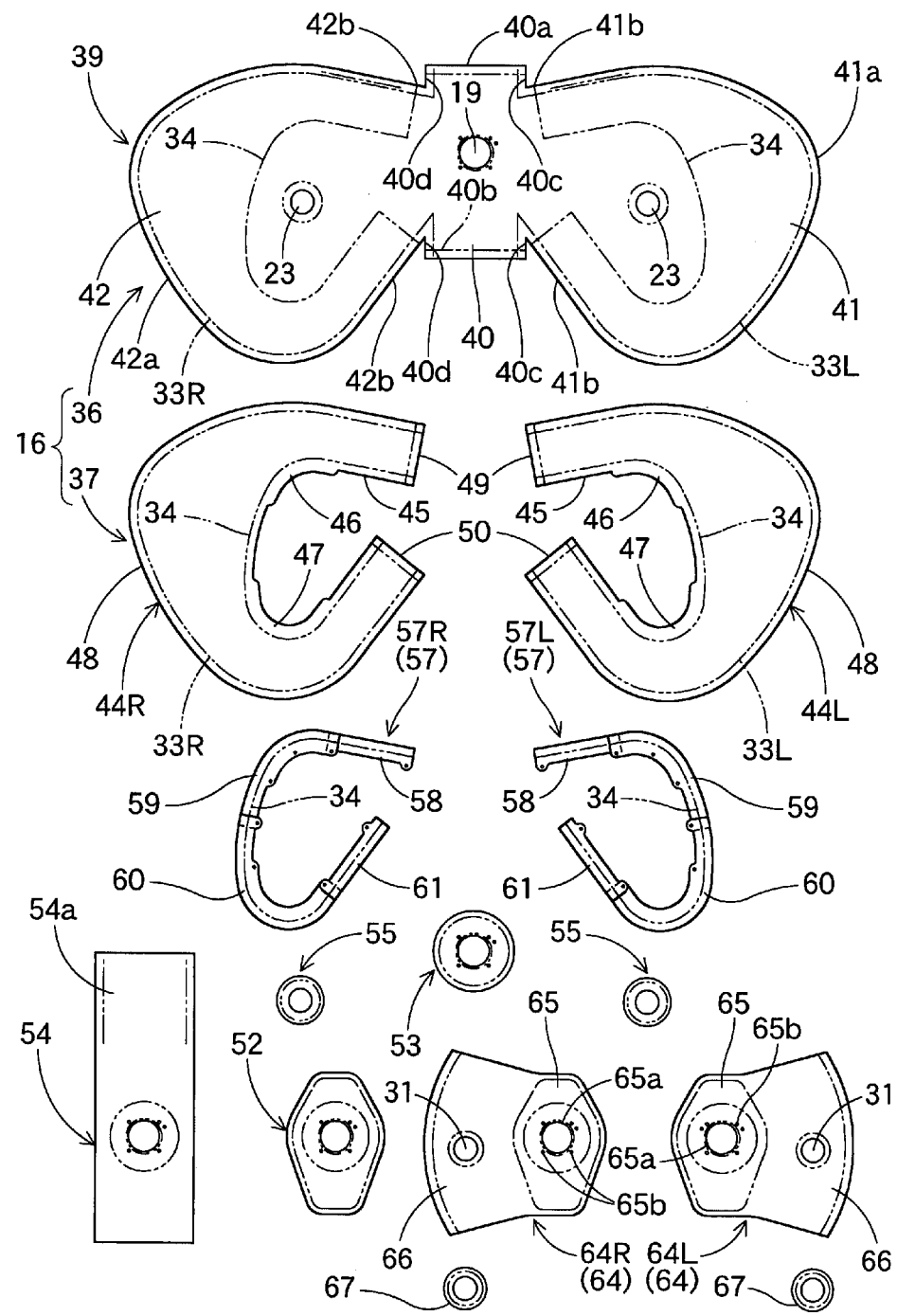
FIG. 6 illustrates components of the airbag of FIG. 1 by plan views.

Flow regulating cloth 29 of this embodiment is made of two laterally symmetric materials 64L and 64R for the flow regulating cloth shown in FIG. 6. Each of materials 64L and 64R includes a joint portion 65 constituting peripheral area 18 of gas inlet port 19 and a main body 66 extending toward the left or right from joint portion 65. Each of joint portion 65 includes an opening 65a correspondent to inlet port 19 and apertures 65b correspondent to mounting holes 20, whereas each of main bodies 66 is provided with through hole 31. Flow regulating cloth 29 is formed by superimposing joint portions 65 of materials 64L and 64R one on the other so that openings 65a and apertures 65b of the respective materials are matched with one another, sewing joint portions 65 to the later-described first base cloth 39 of bag body 16 together with later-described reinforcing cloths 52 and 53 at entire peripheral edges of joint portion 65, and then by sewing up edges of main bodies 66. In this embodiment, a generally annular reinforcing cloth 67 (FIG. 6) is sewn to a periphery of each of through holes 31.

Bag body 16 is made by joining peripheral edges of predetermined shaped base cloths. Bag body 16 includes an outer panel 36 constituting left side wall 16c, right side wall 16d and a front part of lower side wall 16b, and an inner panel 37 constituting upper side wall 16a, rear side wall 16e and a rear part of lower side wall 16b. In this embodiment, as shown in FIG. 6, bag body 16 is formed of a first base cloth 39 for constructing outer panel 36 and a pair of left and right second base cloths 44L and 44R having the same contours for constructing inner panel 37. First base cloth 39, second base cloths 44L and 44R, later-described reinforcing cloths 52, 53, 55, 57 and 67, a later-described protection cloth 54 and materials 64L, 64R for the flow regulating cloth are made of fabric woven by warps VT and wefts HT of polyester, polyamide or the like. The woven fabric is not coated by coating agent such as silicone or the like.

First base cloth 39 has a laterally symmetric contour proximate to a figure of a butterfly spreading its wings. As shown in FIG. 6, first base cloth 39 includes a generally rectangular lower part 40 constituting peripheral area 18 of gas inlet port 19 in vehicle body side area 17, and left and right portions 41 and 42, each of which having a generally triangular plate shape, arranged in such a manner as to extend toward the left and right from lower part 40. Lower part 40 makes a front part of lower side wall 16b of bag body 16 at full inflation, which is the vicinity of gas inlet port 19. Left and right portions 41 and 42 mainly constitute left and right sidewalls 16c and 16d of bag body 16 at full airbag inflation. In this embodiment, left portion 41 and right portion 42 are symmetric about a line running through the center of gas inlet port 19.

As shown in FIGS. 2 and 3, second base cloths 44L and 44R are so constructed to divide the area of inner panel 37 at full inflation into two laterally. In this embodiment, second base cloths 44L and 44R constitute upper side wall 16a, rear side wall 16e and the rear part of lower side wall 16b. Each of base cloths 44L and 44R has a band shape curved in a generally C shape. Outer edges 48 of base cloths 44L and 44R have generally the same shapes as circumferential edges 41a and 42a of left portion 41 and right portion 42 of first base cloth 39 except root side edges 41b and 42b. Outer edges 48 of each of second base cloths 44L and 44R and circumferential edges 41a and 42a of left portion 41 and right portion 42 of first base cloth 39 are sewn up together to provide sewn portions 33L and 33R (FIGS. 2, 3 and 5), and these sewn portions 33L and 33R constitute projected tops 26a of shoulder restraining portions 26L and 26R which are most projected rearward at full airbag deployment.

Inner edges 45 formed at inner circumferences of second base cloths 44L and 44R are not similar to outer edges 48, but are formed into generally oval contours such that its upper end is located forward of the fully inflated airbag 15 while its lower end is located rearward (FIG. 4). These inner edges 45 constitute a leading end or bottom of recess 27 recessing toward the inside of bag body 16, and also outline a circumferential edge of a communication port or communication area 22 communicating left and right shoulder restraining portions 26L and 26R. Specifically, the circumferential edge of communication port 22 is comprised of a sewn portion 34 formed by sewing up inner edges 45 along inner edges 45.

Figure 7:
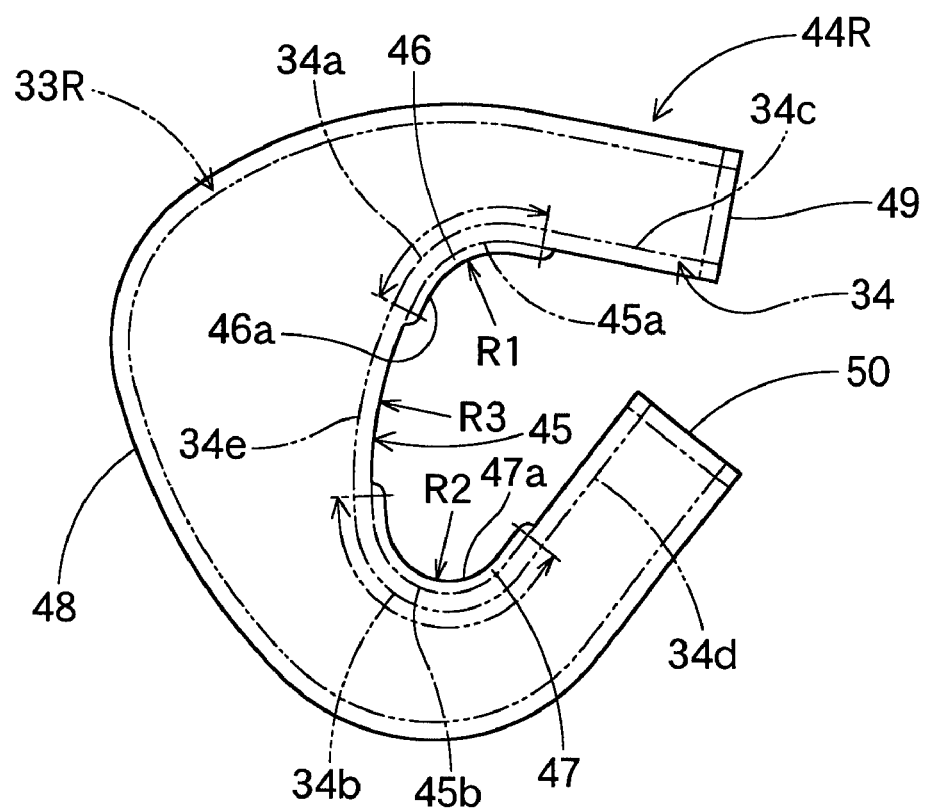
FIG. 7 is a plan view of a second base cloth, which is one of the components shown in FIG. 6, of the airbag.

Referring to phantom lines in FIG. 7, sewn portion 34 is formed proximate inner edges 45 of second base cloths 44L and 44R along inner edges 45. Sewn portion 34 includes a generally straight first general area 34c disposed at the upper front side of the fully inflated bag body 16, a generally straight second general area 34d disposed at the lower front side of the fully inflated bag body 16, a third general area 34e which is disposed at the rear side of the fully inflated bag body 16 and is gently curving, i.e., has a small curvature, a generally quarter-circle arcuate upper corner area 34a disposed at the upper side in such a manner as to connect first and third general areas 34c and 34e and which has a larger curvature than general areas 34c, 34d and 34e, and a generally semicircular arcuate lower corner area 34b disposed at the lower side in such a manner as to connect second and third general areas 34d and 34e and which has a larger curvature than general areas 34c, 34d and 34e. In this specific embodiment, the curvature radius R1 of upper corner area 34a is 130 mm whereas the curvature radius R2 of lower corner area 34b is 116 mm. The curvature radius R3 of third general area 34e is 468.1 mm.

Referring to FIG. 7 again, at regions of inner edge 45 of each of second base cloths 44L and 44R encompassing upper corner area 34a and lower corner area 34b, extended portions 46 and 47 are formed along the entire inner circumference of upper corner area 34a and lower corner area 34b. Each of extended portions 46 and 47 is formed to project inward in such a manner as to enlarge a margin from sewn portion 34. Extended portions 46 and 47 serve as reinforcement for suppressing upper corner area 34a and lower corner area 34b of sewn portion 34 from being deformed in such a manner as to reduce their curvature upon airbag inflation. In the illustrated embodiment, extended portions 46 and 47 are disposed along the whole inner circumference of upper corner area 34a and lower corner area 34b, respectively, such that opposite ends of each of extended portions 46 and 47 are located outside the areas of upper corner area 34a and lower corner area 34b, that is, within general areas 34c, 34d and 34e. Each of inner edges 46a and 47a of extended portions 46 and 47 has a similar contour to upper corner area 34a and lower corner area 34b, respectively, and lengths of inner edges 46a and 47a of extended portions 46 and 47 are set shorter than those of supposed edges 45a and 45b (projected lines of FIG. 7) in a supposed situation where inner edge 45 has no extended portions 46 and 47. Although FIG. 7 only shows second base cloth 44R, base cloth 44L, which is laterally symmetric with base cloth 44R, has the same structure as base cloth 44R, and therefore, descriptions of base cloth 44L are omitted.

Bag body 16 is provided with first and second reinforcing cloths 52 and 53 for reinforcing periphery 18 of gas inlet port 19, a protection cloth 54 for protecting periphery 18 of inlet port 19, a generally annular third reinforcing cloth 55 for reinforcing peripheries of vent holes 23, and fourth reinforcing cloths 57L and 57R for reinforcing sewn portion 34. First reinforcing cloth 52 is formed into such a generally rhombic contour as to cover the inner side of lower part 40 of first base cloth 39 wholly. Second reinforcing cloth 53 has a generally round contour for reinforcing periphery 18 of inlet port 19. Protection cloth 54 has a generally rectangular contour extending toward the front and rear from inlet port 19. Protection cloth 54 is disposed inside bag body 16 in order to prevent inflation gas discharged from inflator 8 from directly hitting sewn-up portions of lower part 40 of first base cloth 39 and of second base cloths 44L and 44R positioned proximate inlet port 19. In the illustrated embodiment, protection cloth 54 includes a front extended portion 54a extending forward from inlet port 19. This front extended portion 54a is sewn to inner positions relative to sewn portions 33L and 33R of bag body 16 at its left and right edges (FIGS. 2 and 4).

Figure 8:
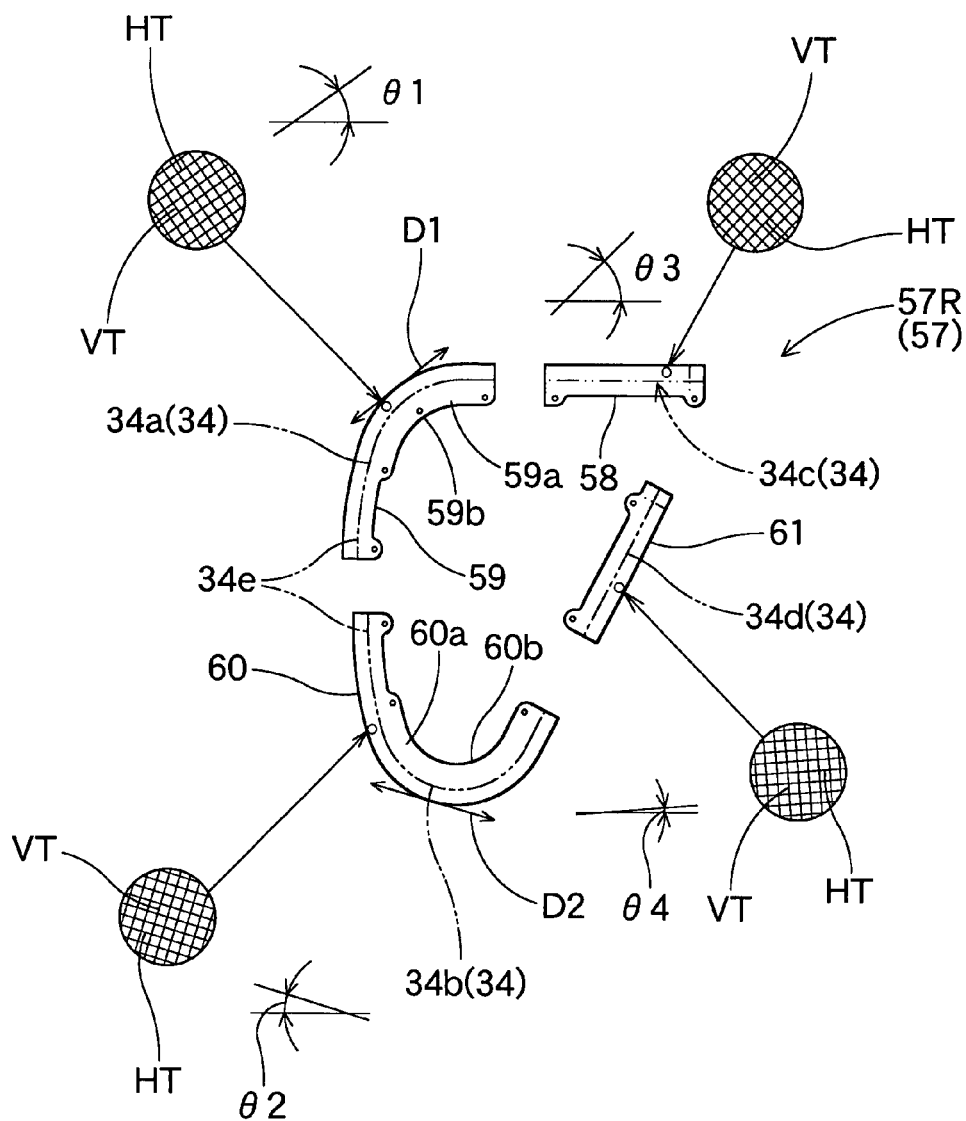
FIG. 8 is a plan view of components of a reinforcing cloth, which is another component of the airbag of FIG. 1.

Each of fourth reinforcing cloths 57L and 57R has a band shape curved in oval manner in accordance with sewn portion 34, i.e., inner edge 45 of second base cloth 44L/44R so it reinforces sewn portion 34. Reinforcing cloths 57L and 57R are formed to cover inner edges 45 of second base cloths 44L and 44R wholly. In this specific embodiment, each of reinforcing cloths 57L and 57R is composed of a plurality of split parts split up along sewn portion 34. More specifically, as shown in FIG. 8, each of reinforcing cloths 57L and 57R is composed of four split parts; a front upper part 58 disposed at first general area 34c of sewn portion 34, an upper corner part 59 disposed at an area from upper corner area 34a to an intermediate region of third general area 34e, a lower corner part 60 disposed at an area from the intermediate region of third general area 34e to lower corner area 34b, and a front lower part 61 disposed at an area of second general area 34d. Front upper part 58, upper corner part 59, lower corner part 60 and front lower part 61 in combination form the same contour as inner edge 45 of second base cloth 44L/44R in a state where they are laid out side by side with their adjoining ends matched with one another, so that they cover inner edge 45 thoroughly without any gaps. Although FIG. 8 shows reinforcing cloth 57R only, reinforcing cloth 57L, which is laterally symmetric with cloth 57R, has the same structure as cloth 57R, and therefore, descriptions of cloth 57L are omitted.

At the inner edge of upper corner part 59 encompassing upper corner area 34a, an extended portion 59a is formed along a generally entire inner circumference of upper corner area 34a. Extended portion 59a is formed to project inward in such a manner as to enlarge a margin from sewn portion 34. On the other hand, at the inner edge of lower corner part 60 encompassing lower corner area 34b, an extended portion 60a is formed along a generally entire inner circumference of lower corner area 34b. Extended portion 60a is also formed to project inward in such a manner as to enlarge a margin from sewn portion 34. As extended portions 46 and 47 formed on inner edges 45 of second base cloths 44L and 44R, extended portions 59a and 60a serve as reinforcement for suppressing upper corner area 34a and lower corner area 34b of sewn portion 34 from being deformed in such a manner as to reduce their curvatures upon airbag inflation. In the illustrated embodiment, each of extended portions 59a and 60a has generally the same outer contour to extended portion 46/47, respectively, and lengths of inner edges 59b and 60b of extended portions 59a and 60b are set shorter than those of supposed edges in a supposed situation where upper corner part 59 and lower corner part 60 have no extended portions 59a and 60a.

In upper corner part 59 and lower corner part 60 of reinforcing cloth 57L/57R, either warps VT or wefts HT weaving parts 59 and 60 extend generally along the tangential direction of upper corner area 34a or lower corner area 34b of sewn portion 34 as shown in FIG. 8. More specifically, upper corner part 59 is formed of a cloth member so cut out that an inclination angle θ1 of its wefts HT is 35° so that wefts HT in upper corner part 59 extend along the tangential direction D1 of upper corner area 34a. Lower corner part 60 is formed of a cloth member so cut out that an inclination angle θ2 of its wefts HT is 16.5° so that wefts HT in lower corner part 60 extend along the tangential direction D2 of lower corner area 34b. These wefts HT of upper corner part 59 and lower corner part 60 serve as reinforcement. In the meantime, in front upper part 58 and front lower part 61, both of warps VT and wefts HT cross general areas 34c and 34d of sewn portion 34. Specifically, an inclination angle θ3 of wefts HT of front upper part 58 is set at 45° whereas an inclination angle θ4 of wefts HT of front lower part 61 is set at 4.1°.

Manufacturing of airbag 15 is now described. Beforehand, reinforcing cloths 55 and 67 are sewn to peripheries of through holes 31 of materials 64L and 64R to be formed into the flow regulating cloth and to peripheries of vent holes 23 of first base cloth 39, respectively. Firstly, reinforcing cloth 52 and materials 64L and 64R are laid over the flattened first base cloth 39 in this order, and are sewn to cloth 39 at a position of a circumferential edge of reinforcing cloth 52 by sewing yarn. Subsequently, protection cloth 54 and reinforcing cloth 53 are laid over material 64R in order, and are sewn to first base cloth 39 together with reinforcing cloth 52 and materials 64L and 64R with sewing yarn at periphery 18 of gas inlet port 19 and the vicinity of the circumferential edge of reinforcing cloth 53. Thereafter, punching work is applied to form gas inlet port 19 and mounting holes 20. Then main bodies 66 of materials 64L and 64R are sewn together at their edges to form flow regulating cloth 29. Although inlet port 19 and mounting holes 20 are punched out after sewing reinforcing cloth 52, materials 64L and 64R, protection cloth 54 and reinforcing cloth 53 to first base cloth 39 in this embodiment, each of cloth 52, materials 64L and 64R, cloth 54 and cloth 53 may be provided with gas inlet port 19 and mounting holes 20 in advance.

Thereafter, second base cloths 44L and 44R are overlaid one on the other, and reinforcing cloths 57L and 57R, each of which are composed of front upper part 58, upper corner part 59, lower corner part 60 and front lower part 61 laid out side by side, are superimposed on second base cloths 44L and 44R in such a manner that reinforcing cloths 57L and 57R sandwich inner edges 45 of second base cloths 44L and 44R. Then inner edges 45 are sewn up together with reinforcing cloths 57L and 57R, thus sewn portion 34 is formed. Subsequently, second base cloths 44L and 44R are opened so that the seam allowance at inner edges 45 are disposed inside and front edges 49 of cloths 44L and 44R line up generally straightly, and these front edges 49 are sewn to a front edge 40a of lower part 40 of first base cloth 39. Likewise, rear edges 50 of second base cloths 44L and 44R lined up straightly are sewn to a rear edge 40b of lower part 40 in first base cloth 39. Then front and rear left edges 40c of lower part 40 are sewn to root side edges 41b of circumferential edge 41a in left portion 41, whereas right edges 40d are sewn to root side edges 42b of circumferential edge 42a in right portion 42. Thereafter, circumferential edge 41a of left portion 41 and outer edge 48 of second base cloth 44L are sewn up together to provide sewn portion 33L, whereas circumferential edge 42a of right portion 42 and outer edge 48 of second base cloth 44R are sewn up to provide sewn portion 33R. Subsequently, left and right side edges of front extended portion 54a of protection cloth 54 are sewn to the vicinities of sewn portions 33L and 33R, respectively, and then airbag 15 is reversed inside out utilizing gas inlet port 19 so that seam allowances of edge areas may not appear outside. Thus airbag 15 is manufactured. If it is difficult to reverse airbag 15 utilizing inlet port 19, it will also be appreciated that airbag body 16 is reversed inside out before the sewing work of the edges of main bodies 66 of materials 64L and 66R to form the flow regulating cloth, and then main bodies 66 are taken out of inlet port 19 to be sewn up.

In airbag 15 embodied according to the invention, second base cloths 44L and 44R are formed into a lateral pair having generally the same contours. Moreover, outer edges 48 of base cloths 44L and 44R are formed into generally the same contours as those of circumferential edges 41a and 42a of left portion 41 and right portion 42 of first base cloth 39 except root side edges 41b and 42b of circumferential edges 41a and 42a. That is, outer edges 48 of base cloths 44L and 44R match circumferential edges 41a and 42a. Therefore, if first base cloth 39 and second base cloths 44L and 44R are overlaid one on another at the sewing work of airbag 15, edges of the base cloths to be sewn up are easily matched with one another, which facilitates the sewing work.

Thereafter, retainer 11 is placed inside airbag 15 so that bolts 11a project from mounting holes 20, and then airbag 15 is folded up in that state. Further, breakable wrapping sheet 13 (FIG. 1) is wound around the folded-up airbag 15 to keep the folded-up configuration. Then the folded-up airbag 15 is placed on bottom wall 6a of case 6 so that bolts 11a project from bottom wall 6a. Subsequently, body 8a of inflator 8 is set in case 6 from lower side of bottom wall 6a while bolts 11a protruded downward from bottom wall 6a are inserted through flange 8c of inflator 8. Thereafter, by fastening bolts 11a protruded from flange 8c of inflator 8 into nuts 12, the folded-up airbag 15 and inflator 8 are attached to bottom wall 6a of case 6.

Then if circumferential wall 6b of case 6 is attached to joint wall 10c of airbag cover 10 in dashboard 1 which has been mounted on vehicle, and the unillustrated brackets of case 6 are fixed to predetermined positions of vehicle body, airbag device M for a front passenger's seat is mounted on vehicle.

Figure 9:
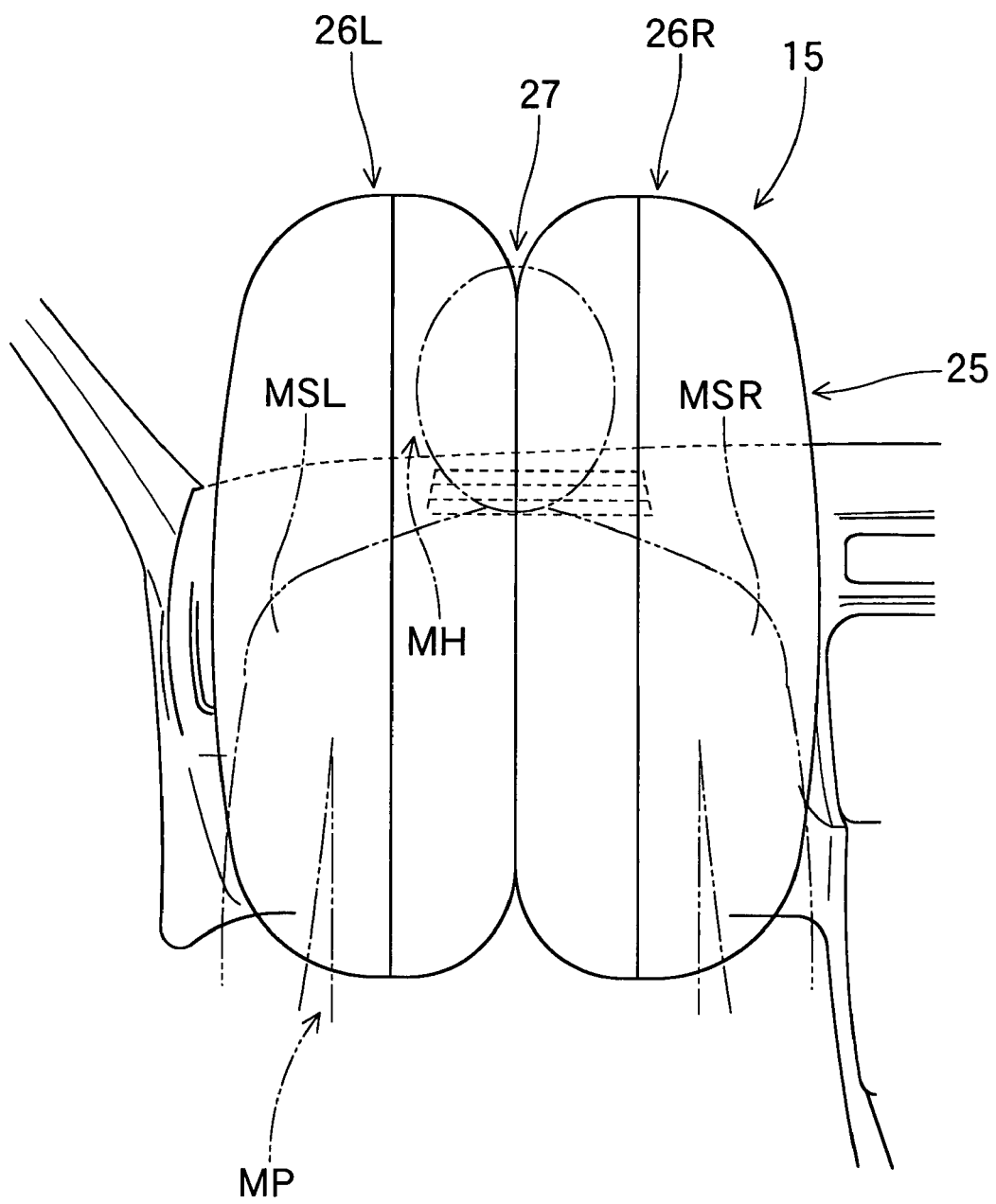
FIG. 9 illustrates the airbag of FIG. 1 in service from the rear, wherein the airbag is fully inflated.
Figure 10:
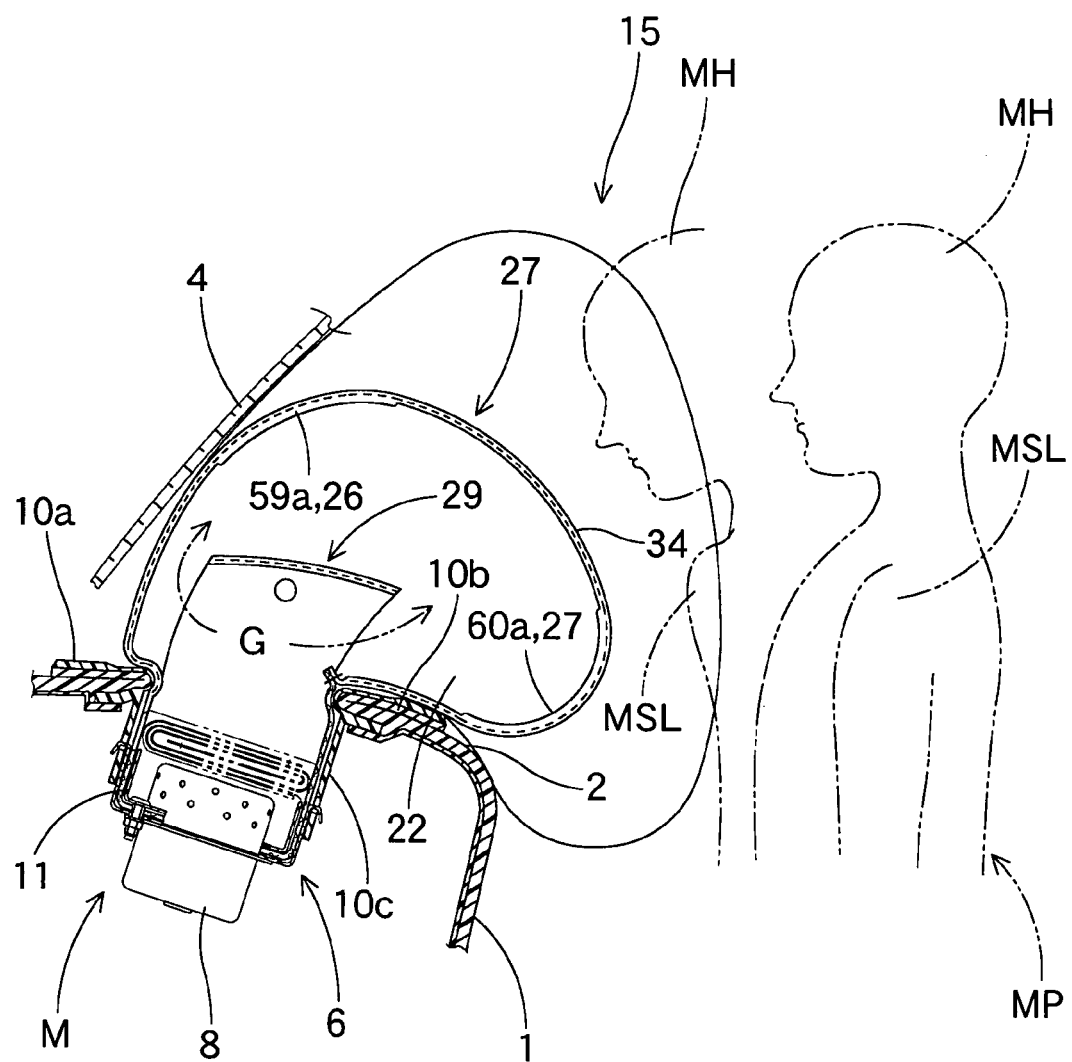
FIG. 10 illustrates the airbag of FIG. 1 in service from a lateral view, wherein the airbag is fully inflated.

After mounting airbag device M on vehicle, in the event of a frontal collision of vehicle, inflation gas is discharged from gas discharge ports 8*b* of inflator 8 to inflate airbag 15. Airbag 15 inflates and breaks wrapping sheet 13, whereas pushes and opens doors 10*a* and 10*b* of airbag cover 10 as shown in FIGS. 1 and 10. Then airbag 15 protrudes upward from an opening provided by the opening of doors 10*a* and 10*b*, and deploys rearward in such a manner as to fill in a space between top plane 2 of dashboard 1 and windshield 4 positioned above dashboard 1. Thus airbag 15 completes inflation as shown in FIGS. 1, 9 and 10.

In airbag 15 of the foregoing embodiment, although joint portion or sewn portion 34 of the inner panel formed by joining inner edges 45 of second base cloths 44L and 44R has upper corner area 34*a* and lower corner area 34*b* having large curvatures, sewn portion 34 is prevented, due to the reinforcement applied to inner edges 45, from being deformed in such a manner as to reduce the curvatures of corner areas 34*a* and 34*b* upon airbag deployment. Hence the whole sewn portion 34 also serving as the circumferential edge of communication port or communication area 22 communicating left and right shoulder restraining portions 26L and 26R is held from being deformed into a generally round contour, thereby suppressing a deformation of projected contours of shoulder restraining portions 26L and 26R located at both sides of communication port 22, and suppressing a change of a clearance between restraining portions 26L and 26R. Consequently, airbag 15 is inflated into a steady contour.

When the inflated airbag 15 is thrown against a passenger MP, left and right shoulder restraining portions 26L and 26R steadily projected rearward firstly receive the vicinities of left and right shoulders MSL and MSR of passenger MP (FIG. 9), thereby reducing forward kinetic energy of passenger MP. Thereafter, a head MH of passenger MP whose shoulders MSL and MSR are restrained by restraining portions 26L and 26R enters into recess 27 recessed relative to restraining portions 26L and 26R between portions 26L and 26R as shown in FIG. 10, and then is restrained and suppressed from moving forward. That is, airbag 15 is capable of receiving head MH of passenger MP whose kinetic energy has been reduced by shoulder restraining portions 26L and 26R softly while applying less reaction force. Moreover, since sewn portion 34 also constituting the leading end or bottom of recess 27 is prevented from being deformed, too, the contour of recess 27 is steady, too, so that head MH of passenger MP is prevented from engaging sewn portion 34 located at the leading end of recess 27 unduly. Accordingly, airbag 15 protects passenger MP in a stable manner by left and right shoulder restraining portions 26L and 26R and recess 27 located between restraining portions 26L and 26R.

Therefore, airbag 15 is inflated into a steady contour for proper protection of passenger MP.

In airbag 15, the reinforcement for suppressing the deformation of sewn portion 34 is comprised of extended portions 46, 47, 59*a* and 60*a* formed on inner edges 45 of second base cloths 44L and 44R forming the inner panel and on inner edges of reinforcing cloths 57L and 57R applied to inner edges 45 at regions encompassing upper corner area 34*a* and lower corner area 34*b* of sewn portion 34 in such a manner as to project inward to enlarge margins from sewn portion 34. Since the lengths of inner edges 46*a*, 47*a*, 59*b* and 60*b* of extended portions 46, 47, 59*a* and 60*a* are set shorter relative to upper corner area 34*a* and lower corner area 34*b* of sewn portion 34, in the event that such a stress is applied to upper corner area 34*a* and lower corner area 34*b* as to widen or elongate corner areas 34*a* and 34*b* upon airbag deployment, inner edges 46*a*, 47*a*, 59*b* and 60*b* of extended portions 46, 47, 59*a* and 60*a* counteract such a deformation as to expand corner areas 34*a* and 34*b*, so that corner areas 34*a* and 34*b* are prevented from being deformed to reduce their curvatures.

Although second base cloths 44L and 44R and reinforcing cloths 57L and 57R provided separate from the second base cloths are both provided with extended portions 46, 47, 59*a* and 60*a* in airbag 15, it will also be appreciated that the extended portions is formed either on the second base cloths or on the reinforcing cloths. In the foregoing embodiment, reinforcing cloths 57L and 57R separate from second base cloths 44L and 44R are applied to sewn portion 34. Accordingly, in comparison with an instance with no reinforcing cloths, the area around sewn portion 34 is further reinforced, thereby further suppressing the deformation in the vicinities of upper corner area 34*a* and lower corner area 34*b* of sewn portion 34. If this advantage does not have to be considered, the airbag may be constructed with no reinforcing cloths for reinforcing the sewn portion. In that instance, the second base cloths include the extended portions.

In the airbag 15, moreover, each of reinforcing cloths 57L and 57R is comprised of four split parts split up along sewn portion 34; front upper part 58, upper corner part 59, lower corner part 60, and front lower part 61. In upper corner part 59 arranged on upper corner area 34*a* of sewn portion 34 and in lower corner part 60 arranged on lower corner area 34*b*, wefts HT weaving parts 59 and 60 extend generally along the tangential directions D1/D2 of upper corner area 34*a*/lower corner area 34*b*, thereby serving as the reinforcement of sewn portion 34. More specifically, even if upper corner area 34*a* and lower corner area 34*b* are stretched out forcefully upon airbag deployment, wefts HT weaving parts 59 and 60 extend along the stretching directions of upper corner area 34*a* and lower corner area 34*b*, not on the bias to the stretching direction, so that wefts HT counteract the stretching force and help prevent upper corner area 34*a* and lower corner area 34*b* from being deformed to be elongated along the stretching directions.

Further, the structure of reinforcing cloths 57L and 57R of the foregoing embodiment that each of cloths 57L and 57R is composed of four split parts, front upper part 58, upper corner part 59, lower corner part 60, and front lower part 61, helps improve the yield of base cloth for forming the reinforcing cloths in comparison with an instance where the reinforcing cloth is composed of a single piece of cloth member. In addition, the split-up structure of the reinforcing cloth enables to change angles of thread directions of upper corner part 59 and lower corner part 60 according to upper corner area 34*a* and lower corner area 34*b* of sewn portion 34, so that both upper corner area 34*a* and lower corner area 34*b* are prevented from being deformed upon airbag deployment. If this advantage does not have to be considered, the reinforcing cloth may be composed of a single piece of cloth member. In the instance where the reinforcing cloth is composed of a single piece of cloth member whereas the sewn portion includes more than one corner areas, it is preferable to form the reinforcing cloth such that either its warps or wefts extend along the tangential direction of a corner area having larger curvature. Further, even when the airbag is formed with no reinforcing cloth for reinforcing the sewn portion, if either warps or wefts weaving the base cloths for forming the inner panel extend along the tangential direction of a corner area of the sewn portion having larger curvature, the sewn portion is prevented from being deformed to reduce the curvature of the corner area.

Figure 11:
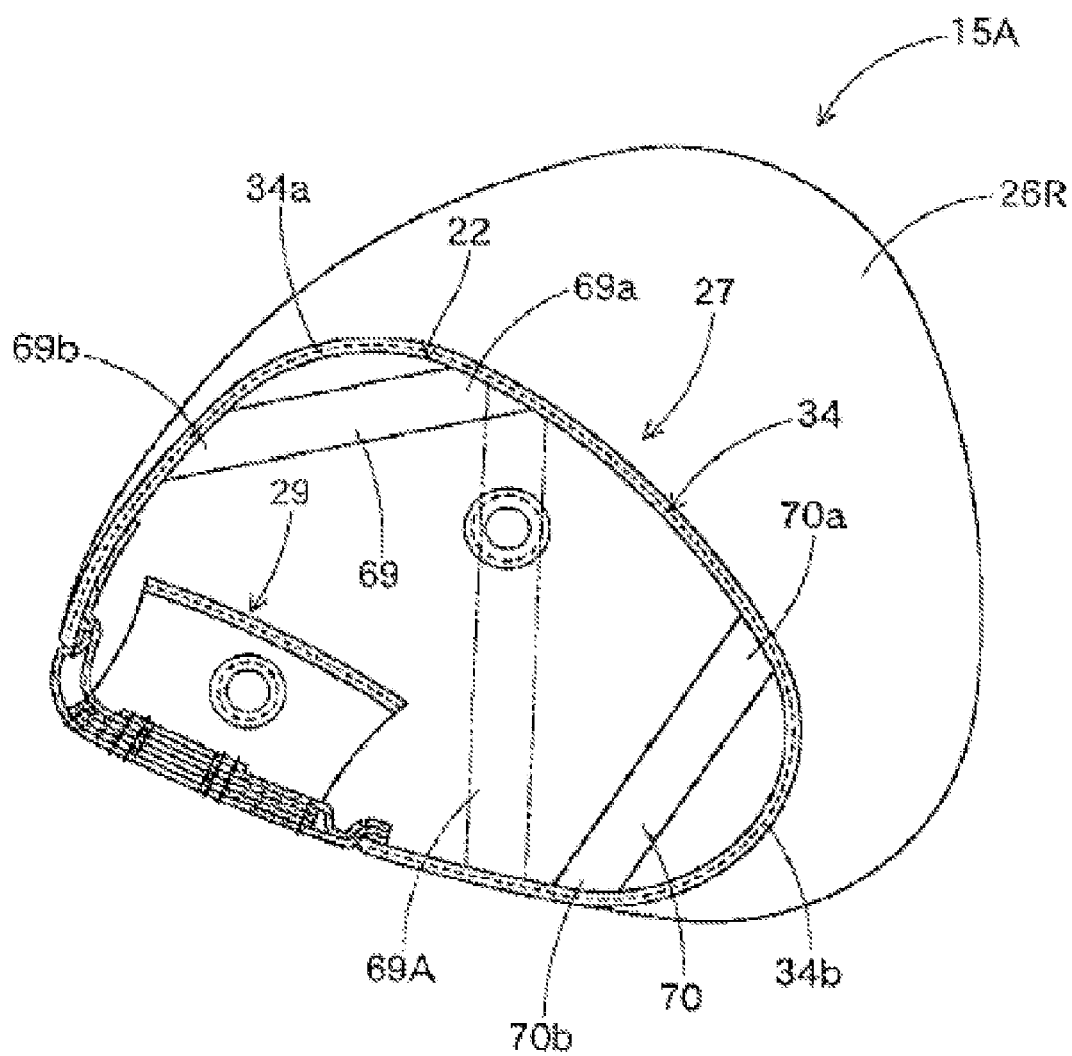
FIG. 11 is a sectional view of an airbag according to another embodiment of the invention taken along the longitudinal direction, wherein the airbag is inflated by itself.

An alternative embodiment of the invention is shown in FIG. 11 as airbag 15A. Airbag 15A includes tethers 69 and 70 each of which is arranged to cut across communication port 22 and sewn to inner edges 45 of second base cloths 44L and 44R proximate sewn portion 34 at opposite ends. Opposite ends 69a and 69b of tether 69 are sewn to the vicinities of upper corner area 34a in inner edges 45 such that the sewn-up opposite ends 69a and 69b encompass upper corner area 34a at the inner side of upper corner area 34a. Opposite ends 70a and 70b of tether 70 are sewn to the vicinities of lower corner area 34b in inner edges 45 such that the sewn-up opposite ends 70a and 70b encompass lower corner area 34b at the inner side of lower corner area 34b.

Upon airbag deployment, tethers 69 and 70 of airbag 15A disposed to cut across communication port 22 counteract the stretching force trying to elongate upper corner area 34a and lower corner area 34b of sewn portion 34, thereby suppressing the deformation of sewn portion 34. Especially in airbag 15A, opposite ends 69a and 69b of tether 69 are sewn to the vicinities of upper corner area 34a in inner edges 45 such that the sewn-up opposite ends 69a and 69b encompass upper corner area 34a at the inner side of upper corner area 34a whereas opposite ends 70a and 70b of tether 70 are sewn to the vicinities of lower corner area 34b in inner edges 45 such that the sewn-up opposite ends 70a and 70b encompass lower corner area 34b at the inner side of lower corner area 34b. Accordingly, upper corner area 34a and lower corner area 34b are prevented from being elongated to lessen their curvature by tethers 69 and 70 counteracting the stretching force upon airbag deployment. Locations and number of such tethers should not be limited to the above-described. For example, the tether may be disposed generally vertically to cut across communication port 22 as a tether 69A indicated by phantom lines in FIG. 11. In this instance, a first end of the tether may be sewn to the peripheral area of the gas inlet port without considering the existence of the flow regulating cloth.

What is claimed is:

1. An airbag for a front passenger's seat folded and housed on a top plane of an instrument panel in front of a front passenger's seat of a vehicle, the airbag protruding upward and deploying rearward when fed with inflation gas in such a manner as to fill in a space between the top plane of the instrument panel and a windshield disposed above the instrument panel, the airbag comprising a gas inlet port for introducing inflation gas at the vicinity of a front end thereof at full inflation and a passenger protection area for protecting a passenger seated in the front passenger's seat, at a rear side of the fully inflated airbag, the airbag being formed into a generally square conical contour whose top is disposed at the front end of the airbag at full inflation, the airbag including a left side wall and a right side wall deployed at lateral sides of the airbag and extending generally along a longitudinal direction, an upper side wall and a lower side wall deployed at upper and lower sides of the airbag and extending generally along the lateral direction, and a rear side wall deployed toward the seat and extending generally along the lateral direction in such a manner as to connect the upper side wall and the lower side wall, the airbag is composed by joining peripheral edges of a plurality of base cloths and includes an outer panel constituting the left side wall and the right side wall, and an inner panel constituting the upper side wall, the lower side wall and the rear side wall, the inner panel is composed of a pair of left and right base cloths having generally the same contours, the base cloths dividing an area of the inner panel at full airbag inflation into two laterally, the base cloths each having a band shape curved in a generally C shape, and formed into the inner panel by joining outer circumferential edges of the respective base cloths to outer edges of regions of the outer panel constituting the left side wall and the right side wall and by joining inner circumferential edges of the respective base cloths together, the passenger protection area comprises a pair of left and right shoulder restraining portions disposed laterally side by side at areas from a top to the rear of the fully inflated airbag, each of the restraining portions projecting continuously from the top to the rear of the airbag, a joint portion, which is formed when joining the inner circumferential edges of the base cloths together for forming the inner panel, constitutes a circumferential edge of a communication area between left and right shoulder restraining portions, the joint portion includes a corner area and a remaining general area, the corner area having a larger curvature than that of the general area, and the joint portion includes a reinforcing portion at the inner circumferential edge of each of the base cloths for suppressing such a deformation of the corner area as to reduce the curvature thereof upon airbag deployment, wherein:

the reinforcing portion is comprised of an extended portion formed by enlarging a margin from the joint portion at a region encompassing at least the corner area in comparison to a margin of a remaining area of the inner circumferential edge, the extended portion being formed partially on the inner circumferential edge.

2. The airbag for a front passenger's seat according to claim 1, wherein the extended portion is comprised of the base cloth for forming the inner panel itself 3. The airbag for a front passenger's seat according to claim 1, wherein the extended portion is comprised of a reinforcing cloth, the reinforcing cloth being a separate entity from the base cloths for forming the inner panel and being joined to the joint portion together with the base cloths.

4. The airbag for a front passenger's seat according to claim 3, wherein:

the reinforcing cloth is comprised of a plurality of split parts split up at more than one positions on the joint portion; and either warps or wefts weaving one of the split parts disposed on the corner area extend generally along a tangential direction of the corner area.

5. The airbag for a front passenger's seat according to claim 1, wherein:

the base cloths for forming the inner panel are made of a fabric woven by warps and wefts, and either the warps or the wefts extend generally along a tangential direction of the corner area; and the reinforcing portion is comprised of the warps or the wefts extending generally along the tangential direction of the corner area.

6. The airbag for a front passenger's seat according to claim 1, wherein:

the airbag further comprises a reinforcing cloth joined together with the base cloths to an entire area of the joint portion and proximate the inner circumferential edges of the base cloths, the reinforcing cloth being a separate entity from the base cloths and having a band shape extending along the joint portion;

the reinforcing cloth is made of a fabric woven by warps and wefts, and either the warps or the wefts extend generally along a tangential direction of the corner area; and the reinforcing portion is comprised of the warps or the wefts extending generally along the tangential direction of the corner area.

7. The airbag for a front passenger's seat according to claim 6, wherein:

the reinforcing cloth is comprised of a plurality of split parts split up at more than one positions on the joint portion; and either the warps or the wefts weaving one of the split parts disposed on the corner area extend generally along a tangential direction of the corner area.

8. An airbag for a front passenger's seat folded and housed on a top plane of an instrument panel in front of a front passenger's seat of a vehicle, the airbag protruding upward and deploying rearward when fed with inflation gas in such a manner as to fill in a space between the top plane of the instrument panel and a windshield disposed above the instrument panel, the airbag comprising a gas inlet port for introducing inflation gas at the vicinity of a front end thereof at full inflation and a passenger protection area for protecting a passenger seated in the front passenger's seat, at a rear side of the fully inflated airbag, the airbag being formed into a generally square conical contour whose top is disposed at the front end of the airbag at full inflation, the airbag including a left side wall and a right side wall deployed at lateral sides of the airbag and extending generally along a longitudinal direction, an upper side wall and a lower side wall deployed at upper and lower sides of the airbag and extending generally along the lateral direction, and a rear side wall deployed toward the seat and extending generally along the lateral direction in such a manner as to connect the upper side wall and the lower side wall, the airbag is composed by joining peripheral edges of a plurality of base cloths and includes an outer panel constituting the left side wall and the right side wall, and an inner panel constituting the upper side wall, the lower side wall and the rear side wall, the inner panel is composed of a pair of left and right base cloths having generally the same contours, the base cloths dividing an area of the inner panel at full airbag inflation into two laterally, the base cloths each having a band shape curved in a generally C shape, and formed into the inner panel by joining outer circumferential edges of the respective base cloths to outer edges of regions of the outer panel constituting the left side wall and the right side wall and by joining inner circumferential edges of the respective base cloths together, the passenger protection area comprises a pair of left and right shoulder restraining portions disposed laterally side by side at areas from a top to the rear of the fully inflated airbag, each of the restraining portions projecting continuously from the top to the rear of the airbag, a joint portion, which is formed when joining the inner circumferential edges of the base cloths together for forming the inner panel, constitutes a circumferential edge of a communication area communicating the between left and right shoulder restraining portions, the joint portion includes a corner area and a remaining general area, the corner area having a larger curvature than that of the general area, and the joint portion includes a reinforcing portion at the inner circumferential edge of each of the base clothes cloths for suppressing such a deformation of the corner area as to reduce the curvature thereof upon airbag deployment, wherein the base cloths for forming the inner panel are made of a fabric woven by warps and wefts, and either the warps or the wefts extend generally along a tangential direction of the corner area; and the reinforcing portion is comprised of the warps or the wefts extending generally along the tangential direction of the corner area.

9. The airbag for a front passenger's seat according to claim 8, wherein:

the airbag further comprises a reinforcing cloth joined together with the base cloths to an entire area of the joint portion and proximate the inner circumferential edges of the base cloths, the reinforcing cloth being a separate entity from the base cloths and having a band shape extending along the joint portion;

the reinforcing cloth is made of a fabric woven by warps and wefts, and either the warps or the wefts extend generally along a tangential direction of the corner area; and the reinforcing portion is comprised of the warps or the wefts extending generally along the tangential direction of the corner area.

10. The airbag for a front passenger's seat according to claim 9, wherein:

the reinforcing cloth is comprised of a plurality of split parts split up at more than one positions on the joint portion; and either the warps or the wefts weaving one of the split parts disposed on the corner area extend generally along a tangential direction of the corner area.

* * * * *